(12) United States Patent
Altmann et al.

(10) Patent No.: US 7,342,188 B2
(45) Date of Patent: Mar. 11, 2008

(54) ROTARY LIGHT SWITCH FOR MOTOR VEHICLES

(75) Inventors: Markus Altmann, Moos-Bankholzen (DE); Stefan Seiler, Radolfzell (DE); Christoph Schostok, Steisslingen (DE); Matthias Rimmele, Singen (DE)

(73) Assignee: TRW Automotive Electronics & Components GmbH & Co. Kg, Radolfzell (DE)

( * ) Notice: Subject to any disclaimer, the term of this patent is extended or adjusted under 35 U.S.C. 154(b) by 0 days.

(21) Appl. No.: 11/211,317

(22) Filed: Aug. 25, 2005

(65) Prior Publication Data

US 2006/0055247 A1   Mar. 16, 2006

(30) Foreign Application Priority Data

Aug. 26, 2004   (DE) .................. 10 2004 041 376

(51) Int. Cl.
*H01H 27/06*   (2006.01)
(52) U.S. Cl. .................. 200/43.08; 200/568; 116/284; 116/31; 307/9.1; 307/115
(58) Field of Classification Search ............... 307/122, 307/10.8, 112, 113, 115, 9.1; 74/335; 340/468, 340/464; 116/28 R, 284, 31, 271; 200/6 B, 200/9, 11 R, 11 DA, 43.04–43.09, 179, 336, 200/568; 315/77, 82, 157–159
See application file for complete search history.

(56) References Cited

U.S. PATENT DOCUMENTS

| | | | | |
|---|---|---|---|---|
| 2,965,725 A | * | 12/1960 | Mason .................... 200/19.12 |
| 5,012,056 A | * | 4/1991 | Abel et al. .................. 200/519 |
| 5,648,756 A | * | 7/1997 | Zadok ........................ 340/468 |
| 5,722,297 A | * | 3/1998 | Tischer et al. ........... 74/473.21 |
| 5,736,696 A | * | 4/1998 | Del Rosso .................. 200/5 R |
| 5,773,935 A | | 6/1998 | Wagner et al. ................ 315/77 |
| 5,780,794 A | * | 7/1998 | Uchiyama et al. ....... 200/61.54 |

(Continued)

FOREIGN PATENT DOCUMENTS

DE   19906035   8/2000

(Continued)

*Primary Examiner*—Haissa Philogene
(74) *Attorney, Agent, or Firm*—Tarolli, Sundheim, Covell & Tummino LLP (57) ABSTRACT

A rotary light switch for motor vehicles is presented that ensures a feel that is not susceptible to mechanical influences. The rotary light switch has an actuator that can be rotated around an axis and that can be moved in the axial direction, and that is non-rotatably coupled to a rotational position indicator and axially coupled to an axial position indicator. Moreover, it has an electronic evaluation circuit to which the signals from the rotational position indicator and from the axial position indicator are fed and, according to a permanently stored decision matrix, said evaluation circuit uses the signals to derive discrete switching states that are converted into switching signals that serve to actuate the lighting system of the vehicle. The rotational position indicator comprises a potentiometer that generates a negligible resistance to the rotational movement, so that no mechanical influences are caused by the rotational position indicator. The axial position indicator is realized in the form of a light barrier system that likewise causes no mechanical counteractions. Thus, the feel of the rotary light switch is largely consistent.

13 Claims, 9 Drawing Sheets

U.S. PATENT DOCUMENTS

| | | | |
|---|---|---|---|
| 6,288,492 B1 | 9/2001 | Wolfe | 315/82 |
| 6,713,896 B1 | 3/2004 | Burtscher et al. | 307/112 |
| 6,894,242 B2 * | 5/2005 | Muller et al. | 200/568 |

FOREIGN PATENT DOCUMENTS

| | | |
|---|---|---|
| DE | 10137883 | 2/2003 |
| EP | 0342031 | 11/1989 |

* cited by examiner

Decision matrix

| & | PL | V | PR | W | 0 | X | A | Y | SL | Z | FL |
|---|----|----|----|----|----|----|----|----|----|----|----|
| B  | PL |    | PR |    | 0  |    | A  |    | SL |    | FL |
| L0 | PL |    | PR |    | 0  |    | A  |    | SL |    | FL |
| B  | PL |    | PR |    | 0  |    |    |    |    |    |    |
| L1 | PL |    | PR |    |    |    | A  |    | SL |    | FL |
| B  |    |    |    |    | 0  |    | A  |    | SL |    | FL |
| L2 | PL |    | PR |    | 0  |    | A  |    | SL |    | FL NL |
| B  | PL |    |    |    |    |    |    |    |    |    | FL |
| L3 | PL |    | PR |    | 0  |    | A  |    | SL NSL |    | FL NSL |
| B  | PL |    | PR |    | 0  |    | A  |    | SL |    | FL |

Switch state unchanged
Error
FL on
Valid state

Fig. 6

| LS1 | LS2 | Position |
|---|---|---|
| 0 | 0 | PL |
| 0 | 0 | PR |
| 0 | 0 | O |
| 1 | 1 | A |
| 1 | 1 | SL |
| 1 | 1 | FL |
| 0 | 1 | SL-NL |
| 0 | 1 | FL-NL |
| 1 | 0 | SL-NSL |
| 1 | 0 | FL-NSL |
| x | B | B |
| B | x | B |

US 7,342,188 B2

ROTARY LIGHT SWITCH FOR MOTOR VEHICLES

TECHNICAL FIELD

The present invention relates to a rotary light switch for motor vehicles, with an actuation shaft that can be rotated about and moved axially along an axis.

BACKGROUND OF THE INVENTION

Rotary light switches are widespread in motor vehicles. As a rule, the actuation shaft is coupled to a knob that latches in various rotational positions and that additionally can be moved axially in certain rotational positions when it is pulled on. The various switching positions of the rotary light switch—combinations of the angle of rotation and the axial position—correspond to switching states of electric switches that ultimately determine the activation of the lighting system of the vehicle: parking lights, side lights, headlights, fog headlights and rear fog lights.

When it comes to rotary light switches that are actuated manually by the driver of the vehicle, it is important to have a consistent feel. This, however, is determined by mechanical factors that have to do with mechanical switches and switch contacts which are actuated directly manually via the actuator. Changes in these mechanical factors—and thus in the feel—due to temperature influences and ageing are unavoidable.

BRIEF SUMMARY OF THE INVENTION

The invention provides a rotary light switch for motor vehicles that ensures a feel that is not susceptible to mechanical influence. The rotary light switch according to the invention has an actuator that can be rotated around an axis and that can be moved in the axial direction, and that is non-rotatably coupled to a rotational position indicator and axially coupled to an axial position indicator. Moreover, it has an electronic evaluation circuit to which the signals from the rotational position indicator and from the axial position indicator are fed and, according to a permanently stored decision matrix, said evaluation circuit uses the signals to derive discrete switching states that are converted into switching signals that serve to actuate the lighting system of the vehicle.

The rotational position indicator can comprise a potentiometer that generates a negligible resistance to the rotational movement, so that no mechanical influences are caused by the rotational position indicator. The axial position indicator can be realized in the form of a light barrier system that likewise causes no mechanical counteractions. Thus, the feel of the rotary light switch remains largely consistent.

The decision matrix provided according to the invention introduces a redundancy that ensures reliable default switching functions in case of theoretically possible malfunctions and precludes unsafe switching functions. Thus, in preferred embodiments of the invention, certain combinations of signals from the rotational position indicator and from the axial position indicator are marked in the decision matrix as errors. Furthermore, certain combinations of signals of the rotational position indicator and of the axial position indicator are marked in the decision matrix as a default switch states. Moreover, certain combinations of signals of the rotational position indicator and of the axial position indicator are marked in the decision matrix as an unchanged switch state. Finally, certain ranges of indication signals of the rotational and/or axial position indicator are marked in the decision matrix as undefined transition areas. The result of these measures is that an erroneous state of the lighting system of the vehicle is reliably avoided.

BRIEF DESCRIPTION OF THE DRAWINGS

Further advantages and features of the invention ensue from the description below, making reference to the accompanying drawings. The drawings show the following.

DETAILED DESCRIPTION OF THE PREFERRED EMBODIMENTS

Figure 1:
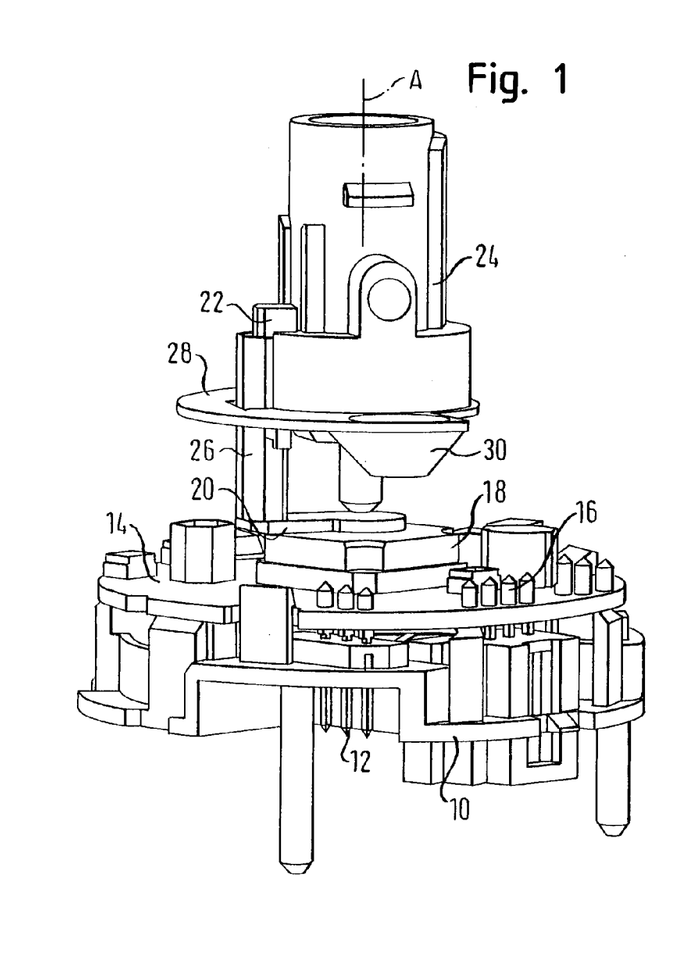
FIG. 1 a perspective view of a baseplate with a printed circuit board and the actuation mechanism of a rotary light switch.

In FIG. 1, the reference numeral 10 designates a baseplate that has a plug-in connector 12 on its outside and a printed circuit board 14 on its inside. The printed circuit board 14 is mechanically connected to the baseplate 10 and has contact pins 16. In the middle, the printed circuit board 14 has a rotary potentiometer 18. The rotary potentiometer 18 has an actuation arm 20 that has a groove-shaped actuator 26 on its free end. An actuation shaft 24 can be rotated around a rotational axis A of the rotary light switch and, at the same time, can be moved axially along this axis A. The actuation shaft 24 has an axially extended actuation finger 22 into which the groove-shaped actuator 26 engages so as to be axially movable but non-rotatable. Furthermore, the actuation shaft 24 has a radial stop ring 28 with a ramp element 30 oriented towards the baseplate 10. The function elements shown in FIG. 1 are accommodated in a pot-like housing (not shown).

Figure 1A:
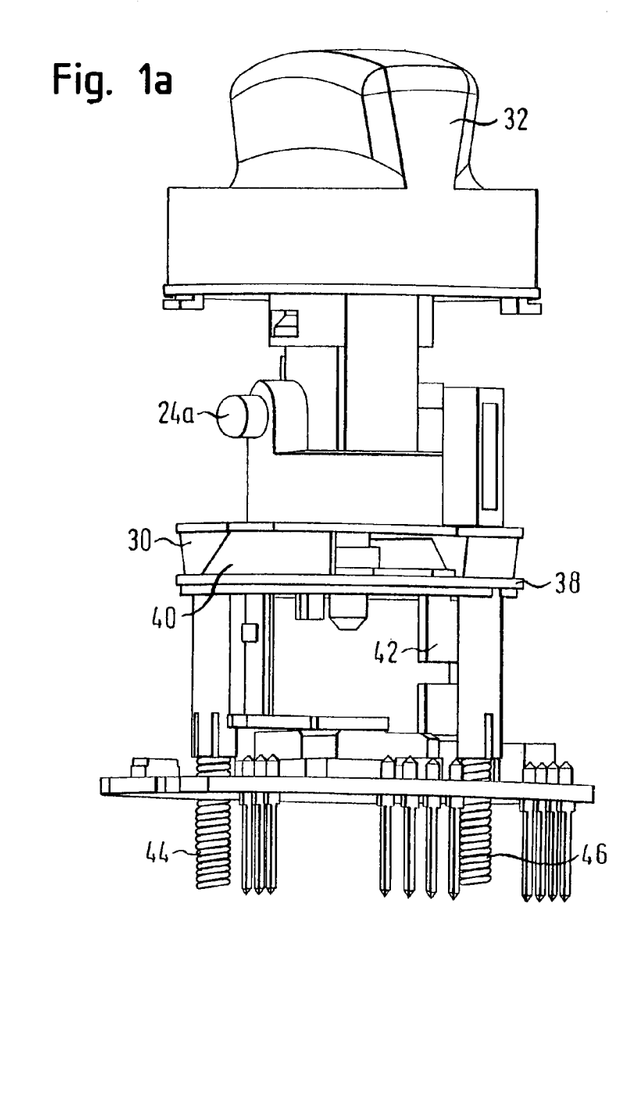
FIG. 1*a* an exploded view of essential functional parts of the rotary light switch with a knob.
Figure 1B:
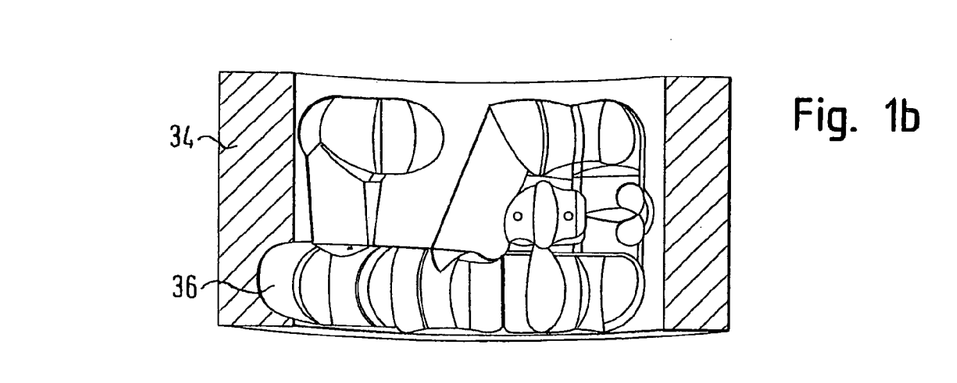
FIG. 1*b* a perspective view of a guide bushing.

The actuation shaft 24 is non-rotatably and axially rigidly coupled to a knob 32 shown in FIG. 1*a* and it has a radially projecting, spring-loaded latching pin 24*a*. A guide bushing 34 connected to the housing (not shown) surrounds the actuation shaft 24 at the height of the latching pin 24*a* and is provided with internal latching curves 36 in which the latching pin 24*a* runs. The latching curves 36 define the various rotational positions and axial positions of the knob 32 and of the actuation shaft 24.

FIG. 1*a* likewise shows a ring-shaped support 38 (which was left out in FIG. 1 for the sake of simplicity) having a ramp element 40 that is complementary to the ramp element 30. A light barrier interrupter 42 that extends in the axial direction and in the direction of the baseplate 10 is attached to the ring element of the support 38 situated in a radial plane. The support 38 is arranged so as to be axially freely movable with the ramp element 40 and with the light barrier interrupter 42, and said support 38 is pressed against the stop ring 28 by compression springs 44, 46 that rest on the baseplate 10 so as to follow the axial position of said stop ring 28. Consequently, the light barrier interrupter 42 also follows the axial position of the actuation shaft 24.

Figure 2:
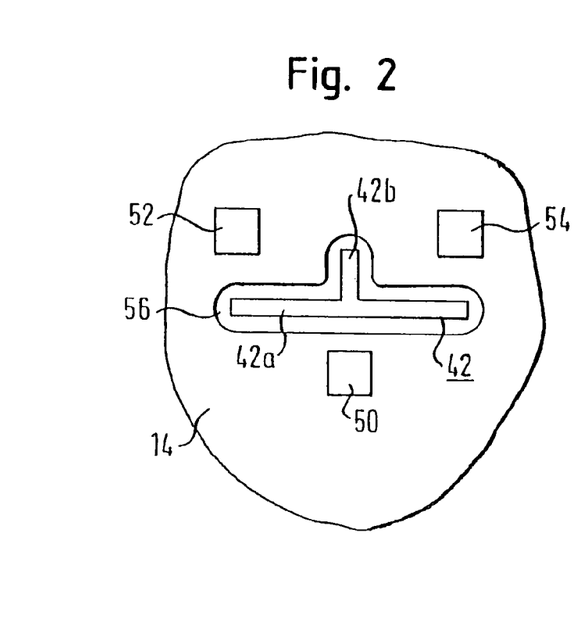
FIG. 2 a partial view of the printed circuit board with a light barrier system mounted on it.
Figure 3:
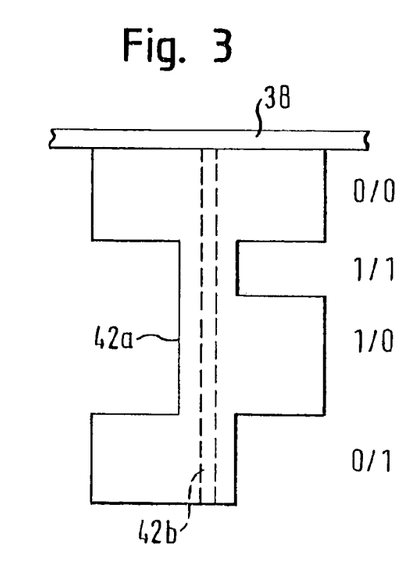
FIG. 3 a side view of a light barrier interrupter of the light barrier system.
Figure 3A:
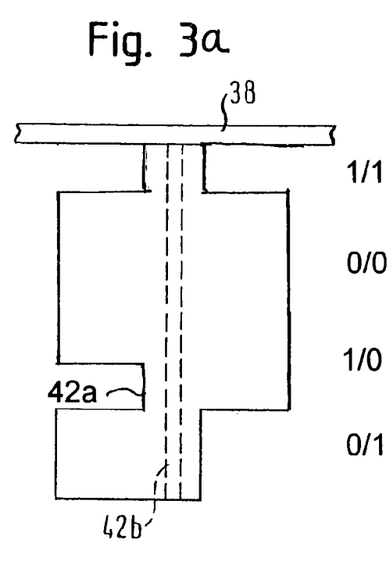
FIG. 3*a* alternative design of the light barrier interrupter.

A light barrier system is set up on the printed circuit board 14. It consists of a light transmitter 50, two light receivers 52, 54 and the light barrier interrupter 42. The light transmitter 50 and the light receivers 52, 54 are arranged on the corners of a triangle. The light barrier interrupter 42 passes through an opening 56 in the printed circuit board 14 and extends generally with a main wing 42a between the light transmitter 50 on the one hand and the light receivers 52, 54 on the other hand, as well as with a shielding wing 42b between the light receivers 52, 54. The main wing 42a has an encoding in the form of blocking wings and passage windows arranged on both sides of the shielding wing. The signal value "1" (light allowed to pass through to the light receiver) is associated with one passage window and the signal value "0" (light path to the light receiver interrupted) is associated with one blocking wing. In the embodiment shown in FIG. 3, the light barrier interrupter 42 embodies the signal value pairs "0/0", "1/1". "1/0" and "0/1", which are at a distance from each other in the axial direction. Each of these four signal value pairs corresponds to one of the four possible axial positions of the support 38 and of the light barrier interrupter 42. An alternative arrangement of the blocking wings and passage windows is shown in FIG. 3a.

The rotational movement of the actuation shaft 24 is transmitted via the actuation finger 22, via the actuator 26 and via the actuation arm 20 to the wiper of the rotary potentiometer 18. Therefore, a voltage tapped at a wiper of the rotary potentiometer 18 serves as a measure of the angle of rotation of the actuation shaft. Consequently, the rotary potentiometer constitutes a rotational position indicator for the rotary light switch.

The support 38 with the light barrier interrupter 42 follows the axial movement of the actuation shaft 24. In addition to its deepest axial position, the actuation shaft 24 also has a first and a second "pulled" positions. The support 38 with the light barrier interrupter 42 can assume another axial position in that the ramp surfaces of the ramp elements 30 and 40 slide on each other, so that the support 38 is pressed by the compression springs 44, 46 against the stop ring 28. The light barrier system supplies one of the signal value pairs "0/0", "1/1", "1/0" and "0/1" for each of the four possible axial positions of the light barrier interrupter 42. Thus, the light barrier system constitutes an axial position indicator for the rotary light switch.

Figure 4:
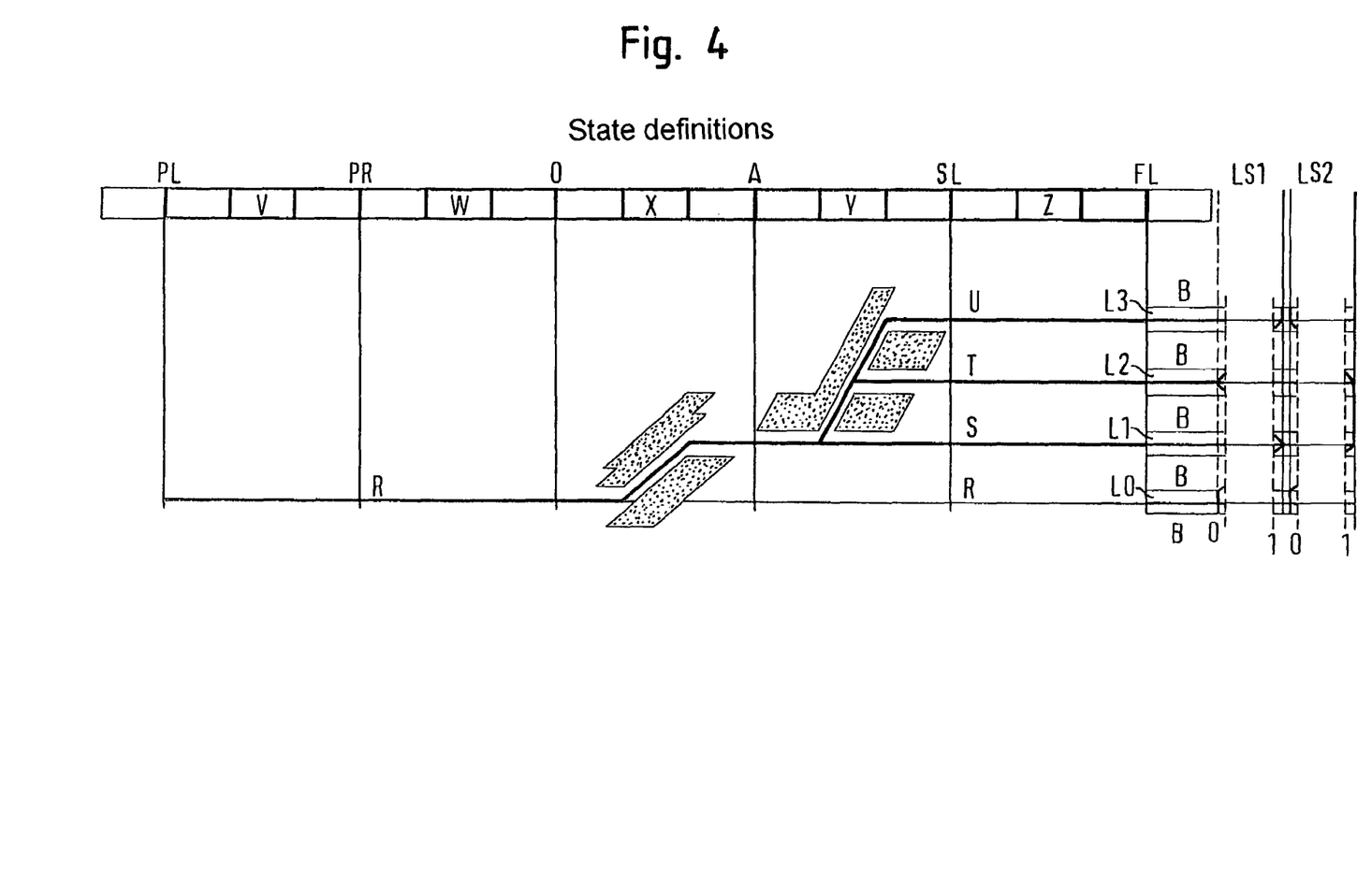
FIG. 4 a graphic depiction of various switch states as a function of the rotational position and the axial position.

In the embodiment shown in FIG. 4, the rotational angle area of the rotary potentiometer 18 or of the actuation shaft 24 is divided into six discrete rotational positions which are each separated by undefined angle areas. Between 0° and 96°, the rotational position PL (left parking light), PR (right parking light), 0 (OFF), A (automatic), SL (side light) and FL (high beams) follow each other consecutively, each separated by one of the undefined angle areas V, W, X, Y and Z. FIG. 4—likewise by way of an example—also shows the four possible axial positions of the light barrier interrupter 42 and the corresponding states of the light barrier system consisting of two light barriers LS1 and LS2 relative to the rotational positions of the actuation shaft 24. In the rotational positions PL, PR and 0, the actuation shaft 24 assumes the deepest axial position R. The light barriers LS1 and LS2 supply the signal value pair "0/0". During the transition from rotational position 0 to rotational position A, the ramp surfaces of the ramp elements 30, 40 converge, as a result of which the light barrier interrupter 42 is moved into the axial position S. The light barriers LS1 and LS2 supply the signal value pair "1/1". Beyond the rotational position A, the latching curve 36 allows the actuation shaft 24 to be pulled by means of the knob 32 into two "pulled" axial positions T (fog headlights) and U (rear fog lights). The light barriers LS1 and LS2 supply the signal value pair "1/0" in the axial position T, and the signal value pair "1/1" in the axial position U. In FIG. 4, the four defined states of the light barrier system corresponding to the discrete axial positions R, S, T and U of the light barrier interrupter 42 are designated as L0 to L3; the transition areas between each two of the states L0 to L3 are undefined and designated as "B".

Figure 5:
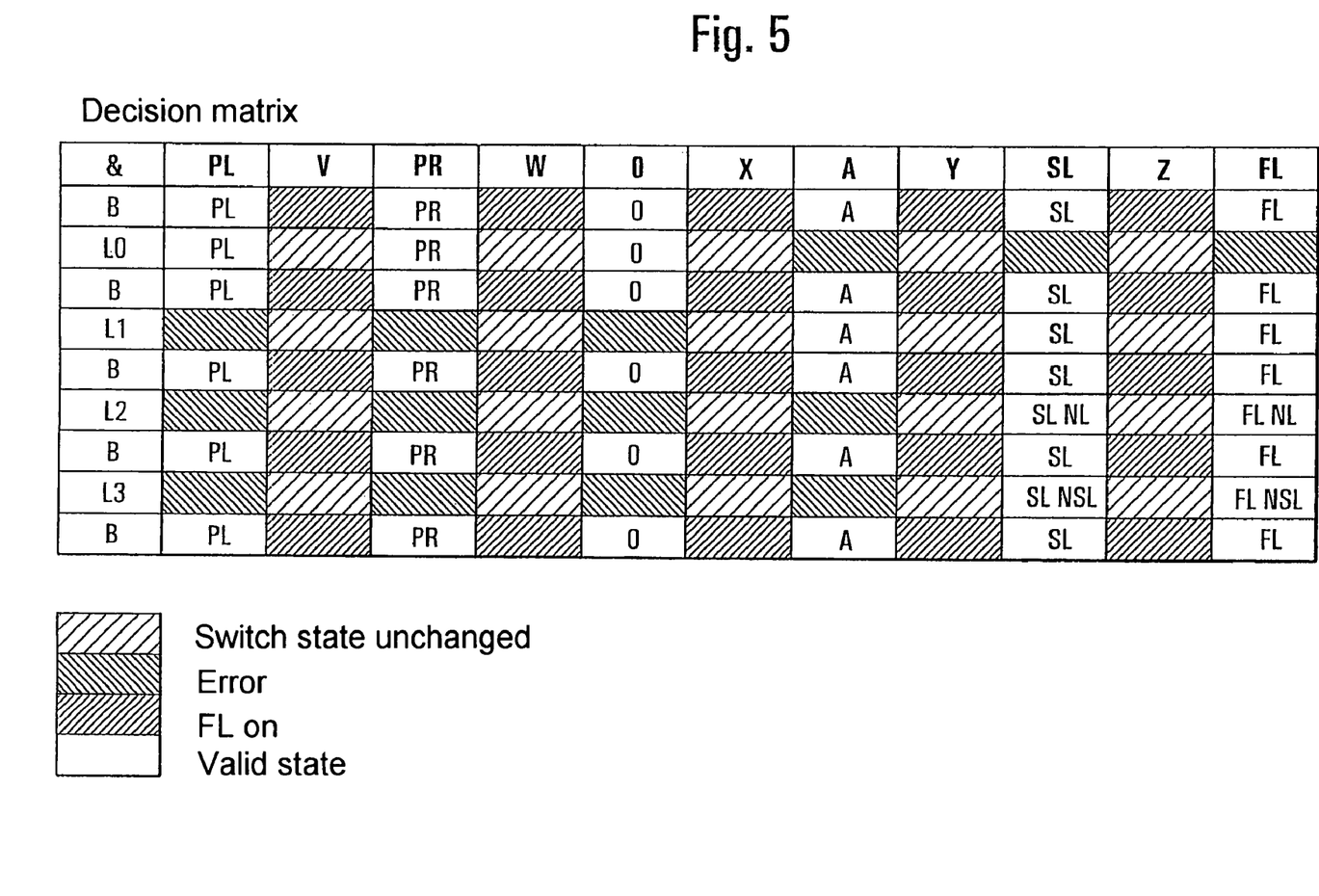
FIG. 5 a decision matrix of the switch states.

FIG. 5 shows the rotational positions PL to FL relative to the states L0 to L3, taking into consideration the transition areas V to Z (angle of rotation) as well as B (axial position), as a decision matrix. In the decision matrix, each combination of rotational position and axial position is allocated to one of the following fields:
  remaining in the current state
  error
  switch on headlights
  valid switch position.

The decision process can be implemented with suitable software in a micro-controller that may have an electronic evaluation circuit to which the signals from the potentiometer 18 and the light barrier system are fed.

Figure 6:
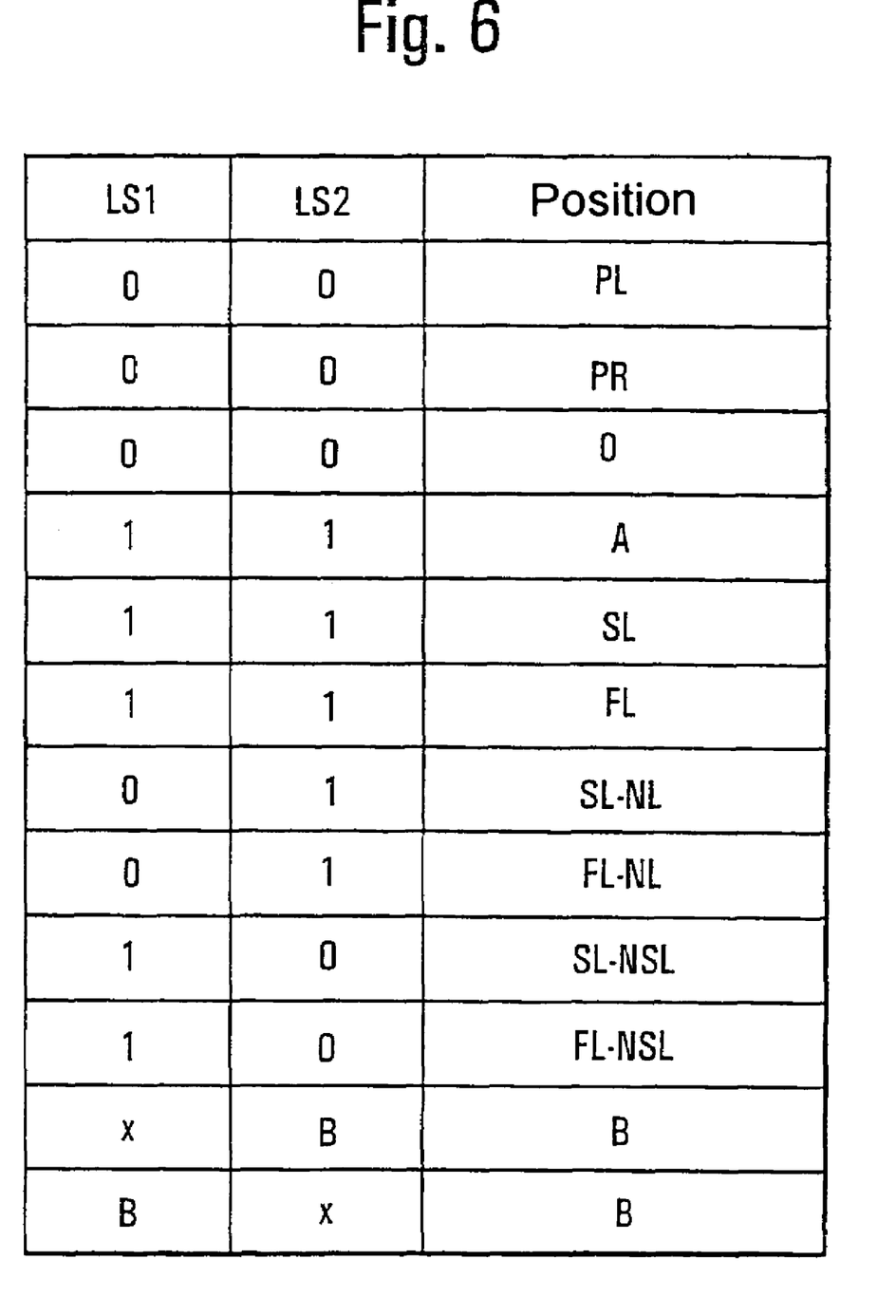
FIG. 6 a table of switch positions as a function of the states of the light barrier system.

FIG. 6 is a compilation in table form of the rotational/axial positions of the rotary light switch relative to the states of the light barriers LS1 and LS2.

Figure 7:
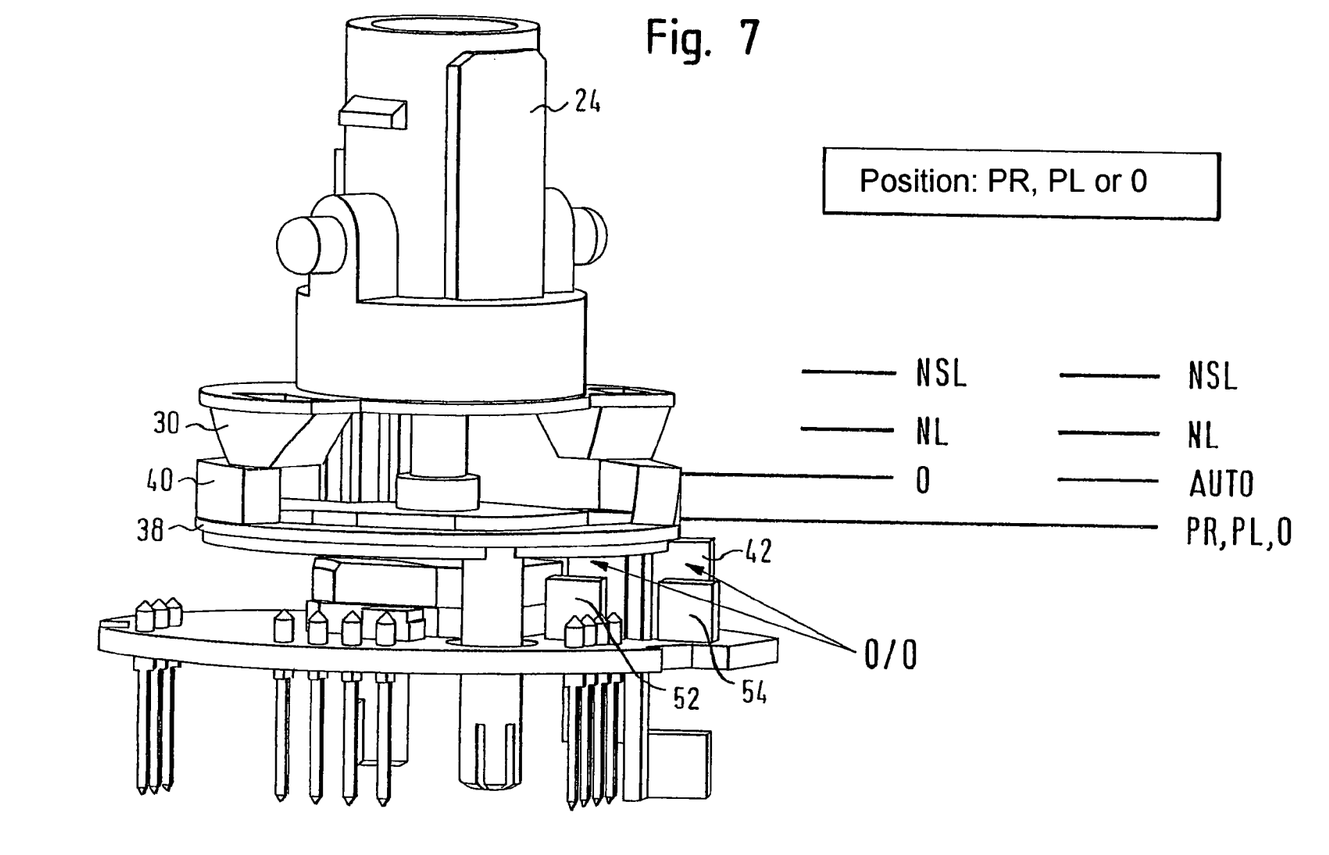
FIGS. 7 to 10 the functional parts shown in FIG. 1*a* in various axial positions.

FIG. 7 shows the actuation shaft 24 and the light barrier interrupter 42 in the deepest axial position in which the switch positions PR, PL and 0 are reached. In this state, the ramp elements 30, 40 are axially congruent. The light barrier system supplies the signal value pair "0/0".

Figure 8:
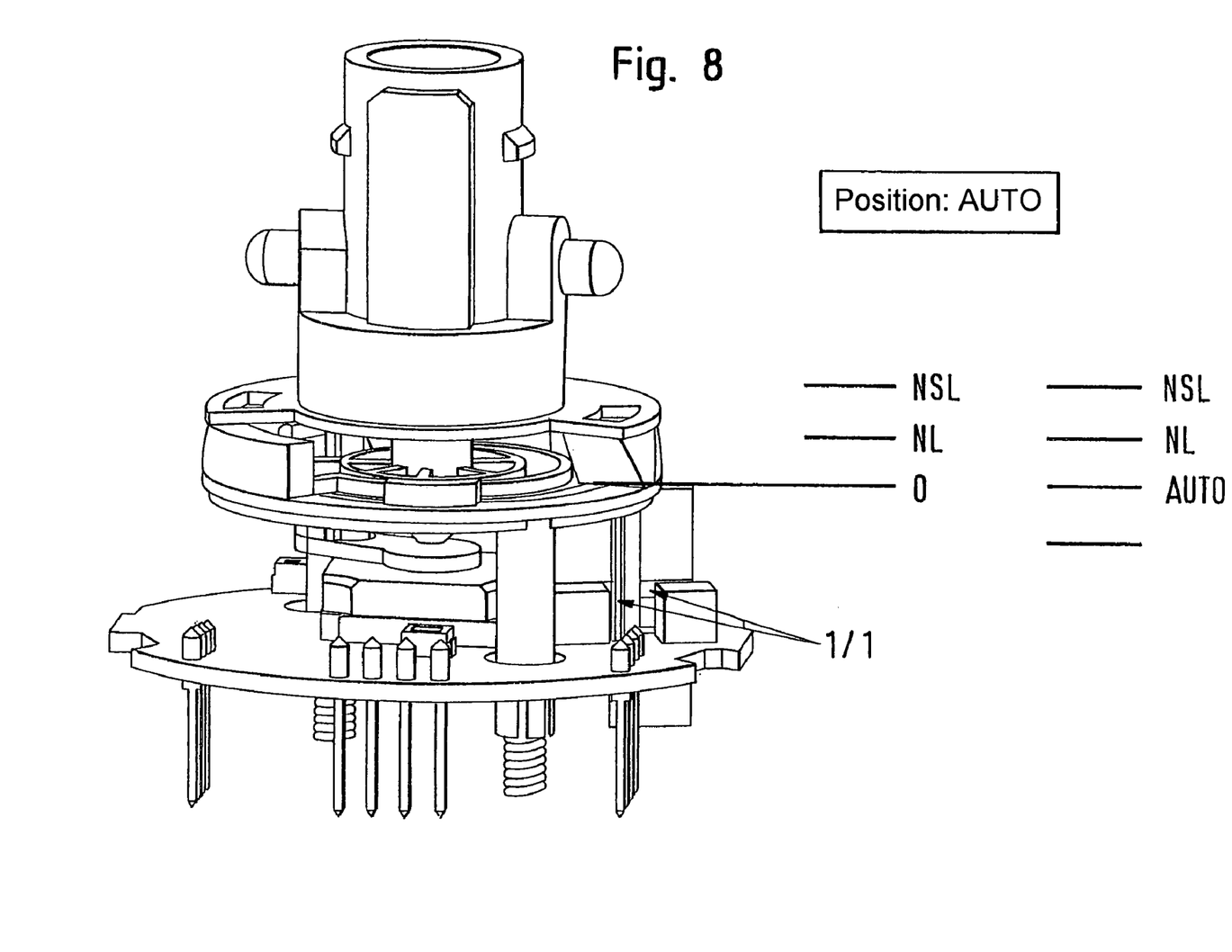

In FIG. 8, the ramp elements 30, 40 are at the same axial height, after their ramp surfaces have slid onto each other, and the support 38 has been moved axially with the light barrier interrupter 42 by the compression springs 44, 46 against the stop ring 28. The light barrier system supplies the signal value pair "1/1". In this state, the switch positions A, SL and FL are reached.

Figure 9:
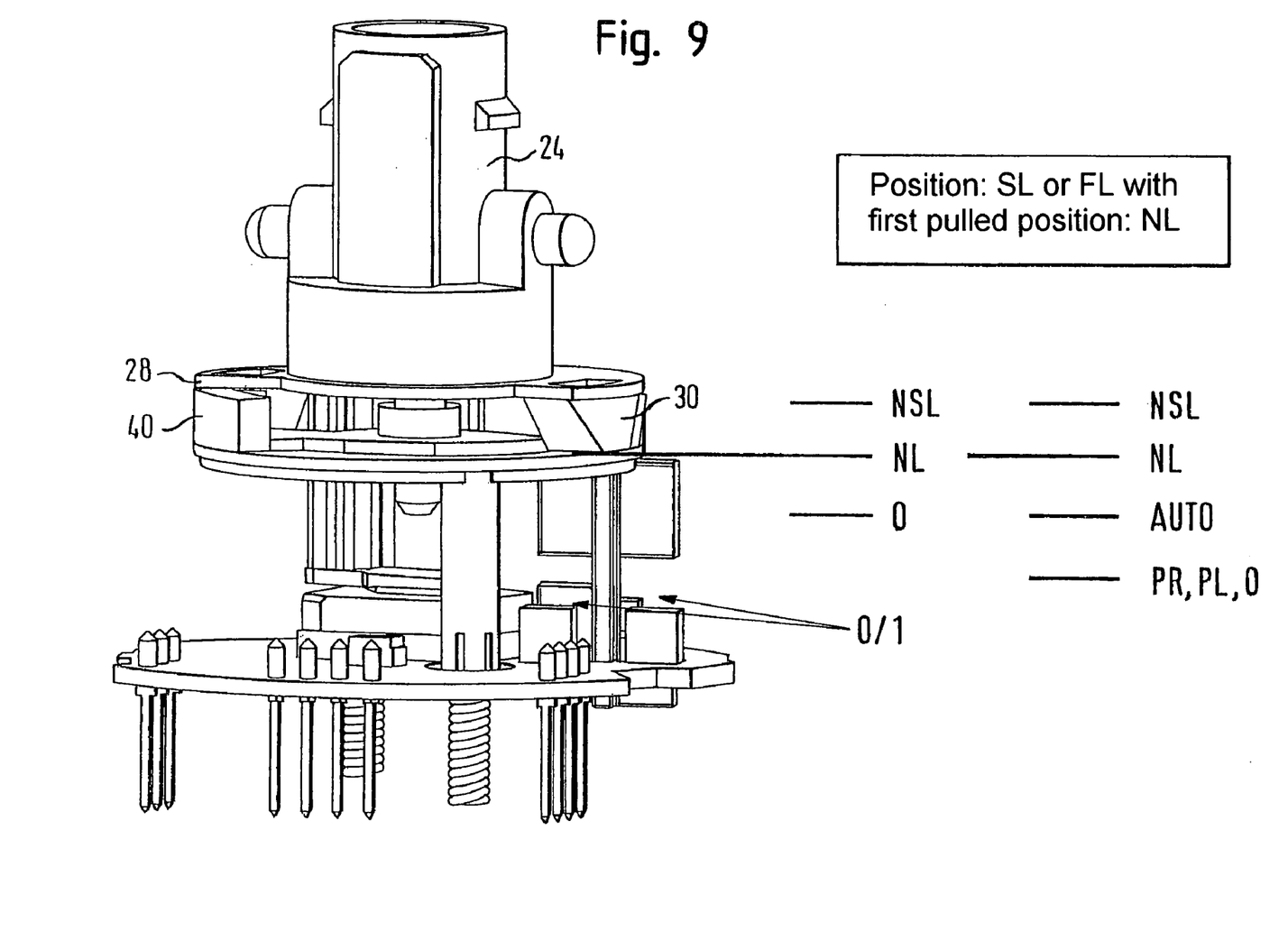

FIG. 9 shows the "first pulled position". The actuation shaft 24 is pulled out of its deepest axial position by a few millimeters. The support 38 with the light barrier interrupter 42 has followed this axial movement. The light barrier system supplies the signal value pair "0/1". In this state, the switch positions SL together with NL or FL together with NL are reached.

Figure 10:
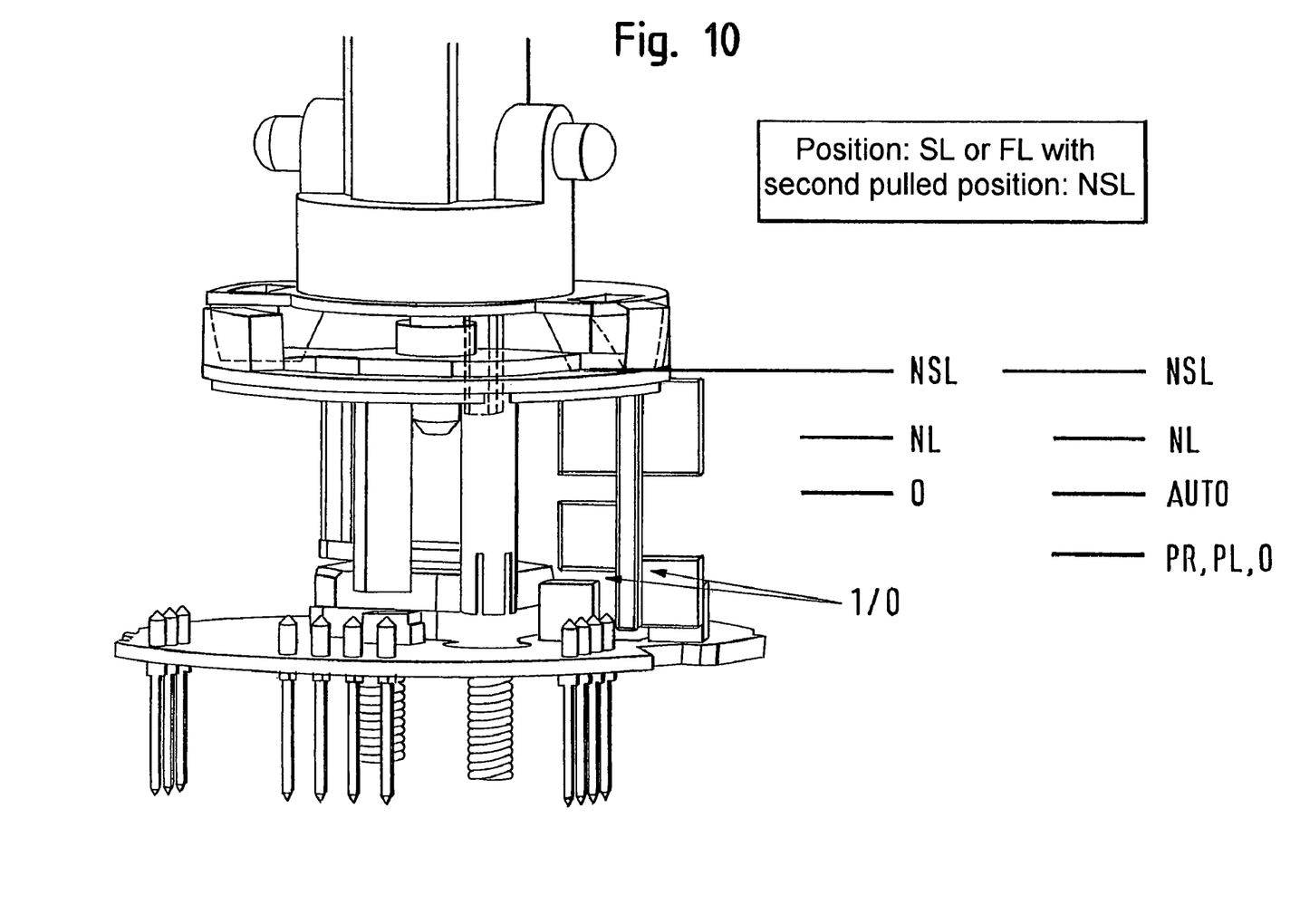

FIG. 10 shows the "second pulled position". The actuation shaft 24 is pulled out of its first pulled position by a few millimeters. The support 38 with the light barrier interrupter 42 has once again followed this axial movement. The light barrier system supplies the signal value pair "1/0". In this state, the switch positions SL together with NSL or FL together with NSL are reached.

Of course, other embodiments of light switches can be implemented using the principles described. The essential aspect is the redundancy of the information provided by the rotational position indicator on the one hand and by the axial position indicator on the other hand for purposes of ensuring unambiguously defined switch states and for avoiding erroneous switch states that would result in unacceptable conditions of the vehicle lighting system.

What is claimed is:

1. A rotary light switch for motor vehicles with a lighting system, comprising an actuator with an actuation shaft mounted for rotation about an axis and axial movement, a rotational position indicator associated with said shaft and providing rotational position indication signals, an axial position indicator also associated with said shaft and providing axial position indicating signals, and an electronic evaluation circuit to which the indication signals from the rotational position indicator and from the axial position indicator are fed, the electronic evaluation circuit incorporating a permanently stored decision matrix, and the evaluation circuit using the indication signals to detect discrete switching states of the light switch and converting the discrete switching states into switching control signals used to actuate the lighting system of the vehicle.

2. The rotary light switch according to claim 1, wherein predetermined combinations of indication signals of the rotational position indicator and of the axial position indicator are marked in the decision matrix as errors.

3. The rotary light switch according to claim 1, wherein predetermined combinations of indication signals of the rotational position indicator and of the axial position indicator are marked in the decision matrix as a default switching state.

4. The rotary light switch according to claim 1, wherein predetermined combinations of indication signals of the rotational position indicator and of the axial position indicator are marked in the decision matrix as an unchanged switch state.

5. The rotary light switch according to claims 1, wherein predetermined ranges of the indication signals of the rotational position indicator are marked in the decision matrix as undefined transition areas.

6. The rotary light switch according to claim 1, wherein predetermined ranges of the indication signals of the axial position indicator are marked in the decision matrix as undefined transition areas.

7. The rotary light switch according to claim 1, wherein the rotational position indicator comprises a potentiometer coupled to the actuator.

8. The rotary light switch according to claim 1, wherein the axial position indicator comprises a light barrier system coupled to the actuator.

9. The rotary light switch according to claim 8, wherein the light barrier system comprises two light barriers and an encoded light barrier interrupter.

10. The rotary light switch according to claim 9, wherein the light barrier interrupter is fastened to an axially movable, non-rotatably maintained support that is caused by pretensioned springs to follow axial movement of the actuator.

11. The rotary light switch according to claim 10, wherein the actuation shaft has an axially rising ramp that extends in a circumferential direction between two rotational positions of the actuation shaft, and the support has a corresponding counter-ramp.

12. The rotary light switch according to claim 11, wherein each of the ramp and the counter-ramp connects two stop surfaces that are spaced from each other in the circumferential direction, axially offset with respect to each other and located in different radial planes.

13. A rotary light switch for motor vehicles with a lighting system, comprising an actuator with an actuation shaft mounted for rotation about an axis and axial movement, a rotational position indicator associated with said shaft and providing rotational position indication signals, an axial position indicator also associated with said shaft and providing axial position indicating signals, and a controller to which the indication signals from the rotational position indicator and from the axial position indicator are fed, the controller incorporating a permanently stored decision matrix, and the controller using the indication signals to detect discrete switching states of the light switch and converting the discrete switching states into switching control signals used to actuate the lighting system of the vehicle.

* * * * *